US010923697B2

(12) United States Patent
Kim et al.

(10) Patent No.: US 10,923,697 B2
(45) Date of Patent: Feb. 16, 2021

(54) ELECTRODE ASSEMBLY AND METHOD FOR MANUFACTURING THE SAME

(71) Applicant: LG Chem, Ltd., Seoul (KR)

(72) Inventors: Soo Young Kim, Daejeon (KR); Jong Hun Kim, Daejeon (KR); Jeong Min Ha, Daejeon (KR); Byoung Jin Shin, Daejeon (KR); Jeong Hwan Kang, Daejeon (KR)

(73) Assignee: LG Chem, Ltd.

( * ) Notice: Subject to any disclaimer, the term of this patent is extended or adjusted under 35 U.S.C. 154(b) by 357 days.

(21) Appl. No.: 15/805,771

(22) Filed: Nov. 7, 2017

(65) Prior Publication Data

US 2018/0130985 A1 May 10, 2018

(30) Foreign Application Priority Data

Nov. 8, 2016 (KR) ........................ 10-2016-0147929

(51) Int. Cl.
| | |
|---|---|
| *H01M 2/14* | (2006.01) |
| *H01M 10/04* | (2006.01) |
| *H01M 6/46* | (2006.01) |
| *H01M 2/02* | (2006.01) |
| *H01M 2/16* | (2006.01) |

(52) U.S. Cl.
CPC ............ *H01M 2/14* (2013.01); *H01M 2/0207* (2013.01); *H01M 2/0275* (2013.01); *H01M 6/46* (2013.01); *H01M 10/0436* (2013.01); *H01M 10/0459* (2013.01); *H01M 2/168* (2013.01); *H01M 2/1673* (2013.01); *H01M 2220/30* (2013.01)

(58) Field of Classification Search
CPC ..... H01M 2/14; H01M 2/145; H01M 10/0459
See application file for complete search history.

(56) References Cited

U.S. PATENT DOCUMENTS

| | | | |
|---|---|---|---|
| 6,709,785 B2 | 3/2004 | Lee et al. | |
| 9,209,491 B2 | 12/2015 | Kim et al. | |
| 10,122,041 B2 | 11/2018 | Redmann | |
| 2002/0160257 A1 | 10/2002 | Lee et al. | |
| 2004/0154160 A1* | 8/2004 | Hong ................. | H01M 10/052 29/730 |
| 2011/0052964 A1 | 3/2011 | Kim et al. | |

(Continued)

FOREIGN PATENT DOCUMENTS

| | | |
|---|---|---|
| JP | 2003523059 A | 7/2003 |
| JP | 2011507184 A | 3/2011 |
| JP | 2015532513 A | 11/2015 |

(Continued)

OTHER PUBLICATIONS

Supplementary European Search Report corresponding to European Patent Application No. 17869470, dated Apr. 18, 2019, 7 pages.

*Primary Examiner* — Stephan J Essex
(74) *Attorney, Agent, or Firm* — Lerner, David, Littenberg, Krumholz & Mentlik, LLP (57) ABSTRACT

An electrode assembly and a method for manufacturing the electrode assembly comprises a plurality of unit cells comprising a positive electrode, a negative electrode, and a separator, respectively, and a separation film folded to be disposed between the plurality of unit cells. The separation film is folded two times or more to come into contact with and surround a first unit cell, which is disposed at an initial position of the separation film, of the plurality of unit cells.

14 Claims, 9 Drawing Sheets

(56) References Cited

U.S. PATENT DOCUMENTS

2013/0011715 A1    1/2013  Lee et al.
2015/0263375 A1    9/2015  Redmann

FOREIGN PATENT DOCUMENTS

| | | | |
|---|---|---|---|
| KR | 20010082059 | A | 8/2001 |
| KR | 20090008075 | A | 1/2009 |
| KR | 20100051353 | A | 5/2010 |
| KR | 20150045624 | A | 4/2015 |
| KR | 20150051498 | A | 5/2015 |
| KR | 1020150087208 | A | 7/2015 |
| KR | 10-2016-0010121 | A | 1/2016 |
| KR | 10-2016-0020204 | A | 2/2016 |
| WO | 2009/078632 | A2 | 6/2009 |

* cited by examiner

ELECTRODE ASSEMBLY AND METHOD FOR MANUFACTURING THE SAME

CROSS-REFERENCE TO RELATED APPLICATIONS

This application claims the priority of Korean Patent Application No. 10-2016-0147929 filed on Nov. 8, 2016, the disclosure of which is incorporated herein by reference in its entirety.

TECHNICAL FIELD

The present invention relates to an electrode assembly and a method for manufacturing the same.

RELATED ART

Typically, secondary batteries are rechargeable unlike primarily batteries. Recently, many studies on secondary batteries have been conducted to research producing a battery of compact size and increased capacity. As technology development and demands for mobile devices increase, demands for secondary batteries as energy source are rapidly increasing. Secondary batteries are classified into coin type batteries, cylindrical type batteries, prismatic type batteries, and pouch type batteries according to a shape of a battery case. In particular, a secondary battery has an electrode assembly mounted in a battery case with a chargeable and dischargeable power generating device having a structure with a laminated an electrode and a separator.

The electrode assembly may be approximately classified into a layered spiral arrangement (e.g., jelly-roll type) electrode assembly with a separator interposed between a positive electrode and a negative electrode, each of which is provided as the form of a sheet coated with an active material. Then the positive electrode, the separator, and the negative electrode are wound. A stack type electrode assembly includes a plurality of positive and negative electrodes with a separator therebetween that are sequentially stacked. A stack or folding type electrode assembly includes stack type unit cells wound with a separation film having a long length. Among them, the layered spiral arrangement jelly-roll type electrode assembly is widely used because it has an advantage of being more easily manufactured and having an increased energy density per weight.

The above information disclosed in this section is merely for enhancement of understanding of the background of the disclosure and therefore it may contain information that does not form the prior art that is already known in this country to a person of ordinary skill in the art.

SUMMARY

The present disclosure provides an electrode assembly in which a separation film is prevented from being unfolded when a plurality of unit cells are folded together with the separation film, and an electrode is not exposed, and a method for manufacturing the same. In an aspect of an exemplary embodiment of the present disclosure, an electrode assembly may comprise a plurality of unit cells comprising at least one positive electrode, at least one negative electrode, and at least one separator, respectively; and a separation film folded to be disposed between the plurality of unit cells. The separation film may be folded at least two times to come into contact with and surround a first unit cell, which is disposed at an initial position of the separation film, of the plurality of unit cells.

In some exemplary embodiments, the electrode assembly may include the separation film that comprises a first folding part folded to surround the first unit cell and a second folding part additionally folded one more time to surround the first unit cell. In other exemplary embodiment, the electrode assembly may include the first folding part that adheres to a portion of the separation film, which faces the first folding part when folded, by applying an adhesion layer to an exterior surface thereof in a folding direction.

In other exemplary embodiments the electrode assembly may include the first folding part and the second folding part surrounding an entire exterior circumference of the first unit cell. Additionally, the electrode assembly may include the first folding part surrounding an end of a first surface and a first side surface of the first unit cell, and the second folding part surrounding a second surface and a second side surface of the first unit cell. In some exemplary embodiments, the electrode assembly may include an adhesion layer disposed on an interior surface of the first folding part in a folding direction so that the first folding part adheres to the first unit cell through an adhesion layer.

In another aspect of an exemplary embodiment of the present disclosure, a method for manufacturing an electrode assembly may comprise preparing a plurality of unit cells, each of which comprises a (e.g., at least one) positive electrode, a (e.g., at least one) negative electrode, and a (e.g., at least one) separator, and a separation film, seating the plurality of unit cells on one surface of the separation film and successively folding the separation film on which the unit cells are seated so that the separation film is disposed between the plurality of unit cells. Additionally, in the folding, the separation film may be folded at least two times to come into contact with and surround a first unit cell, which is disposed at an initial position of the separation film of the plurality of unit cells.

In some exemplary embodiment, the method may include seating the plurality of unit cells successively arranged on the separation film, and a distance between the first unit cell and a second unit cell adjacent to the first unit cell of the plurality of unit cells may be defined as a1, a width of the first unit cell may be defined as w1, and a height of the first unit cell may be defined as h1, the unit cells are arranged to satisfy a following equation: $2*w1+4*h1<a1$. In other exemplary embodiments, the method may include folding the first unit cell rotated at an angle of about 360 degrees or greater to allow the separation film to surround a circumference of the first unit cell.

In another exemplary embodiment, the seating may include the plurality of unit cells successively arranged on the separation film, and a distance between the first unit cell and a second unit cell adjacent to the first unit cell of the plurality of unit cells may be defined as a1, a distance between an end of the separation film and the first unit cell may be defined as a3, a width of the first unit cell may be defined as w1, and a height of the first unit cell may be defined as h1, the unit cells may be arranged to satisfy a following equation: $1*w1+3*h1<a2$ and $1*w1+1*h1<a3$.

In other exemplary embodiments, the folding may comprise folding an end of the first separation film toward the first unit cell in a first folding process to allow a first folding part of the separation film to surround the first surface and a first side surface of the first unit cell and rotating the first unit cell in a second folding process at an angle of about 180 degrees to allow a second folding part of the separation film to additionally surround a circumference of the first unit cell.

In some exemplary embodiments, the first folding process may include the first folding part that surrounds an end of the first surface and the first side surface of the first unit cell. In another exemplary embodiment, the first folding process may include air injected to the first folding part of the separation film to fold the first folding part to the first unit cell.

In some exemplary embodiments, the first folding process may include the first folding part folded to the first unit cell through a sharp change of direction. In other exemplary embodiments, the separation film may comprise a first folding part folded to surround the first unit cell and a second folding part additionally folded one more time to surround the first unit cell and the folding further comprises: applying an adhesion layer to an exterior surface in a folding direction of the first folding part; and adhering a portion of the separation film, which faces the first folding part, to the adhesion layer when folded.

In another exemplary embodiment, the first folding process may comprise applying the adhesion layer to an interior surface in the folding direction of the first folding part to form an adhesion layer and adhering the first folding part to the first unit cell through the adhesion layer.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION

The objects, other objectives, features, and advantages of the present disclosure will be understood without difficulties through preferred embodiments below related to the accompanying drawings. It is noted that the same or similar components in the drawings are designated by the same reference numerals as far as possible even if they are shown in different drawings. The present disclosure may, however, be embodied in different forms and should not be construed as limited to the embodiments set forth herein. Moreover, detailed descriptions related to well-known functions or configurations will be ruled out in order not to unnecessarily obscure subject matters of the present disclosure.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, in order to make the description of the present disclosure clear, unrelated parts are not shown and, the thicknesses of layers and regions are exaggerated for clarity. Further, when it is stated that a layer is "on" another layer or substrate, the layer may be directly on another layer or substrate or a third layer may be disposed therebetween.

General terms used as widely as possible at present are selected as the terms used in this disclosure while a function thereof in the disclosure is considered, but the terms may be changed according to intention of those skilled in the art, precedent, emergence of new technique, or the like. In addition, in a specific case, there may also be terms arbitrarily selected by the applicant, and in this case, the meaning of the terms may be described in detail in the description section of the disclosure. Thus, the terms used in this disclosure should be defined not on the basis of the simple names thereof but on the basis of the meaning thereof and contents thereof entirely over the present disclosure.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Figure 1:
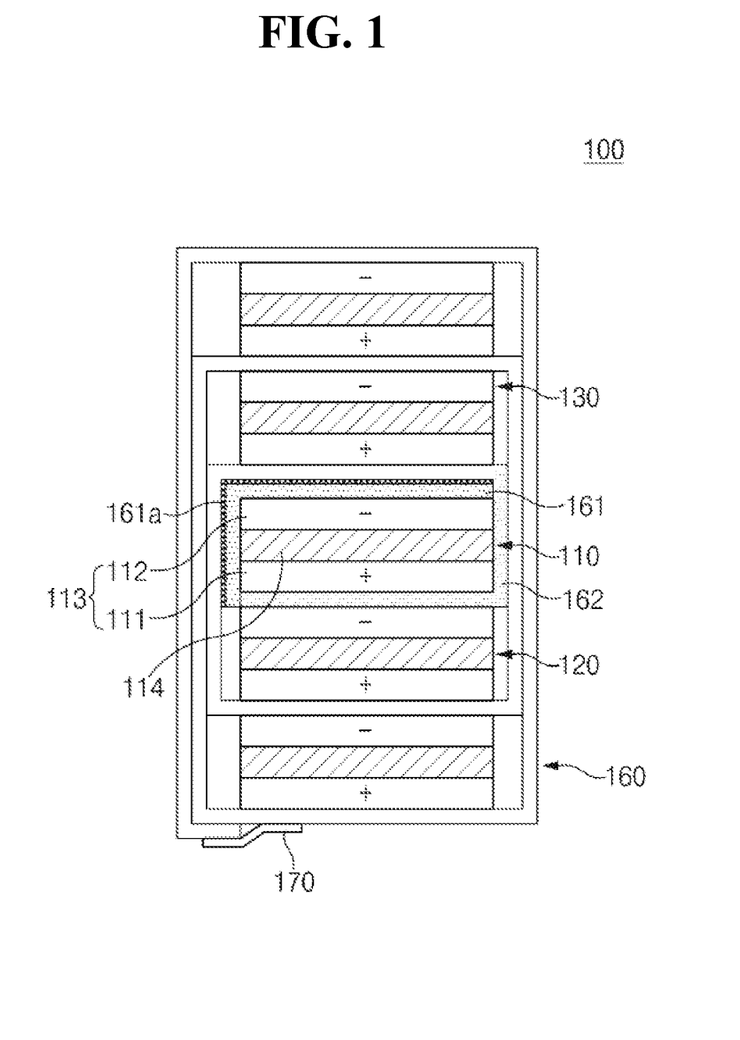
FIG. 1 is an exemplary schematic cross-sectional view illustrating an example of an electrode assembly according to an exemplary embodiment of the present disclosure.
Figure 2:
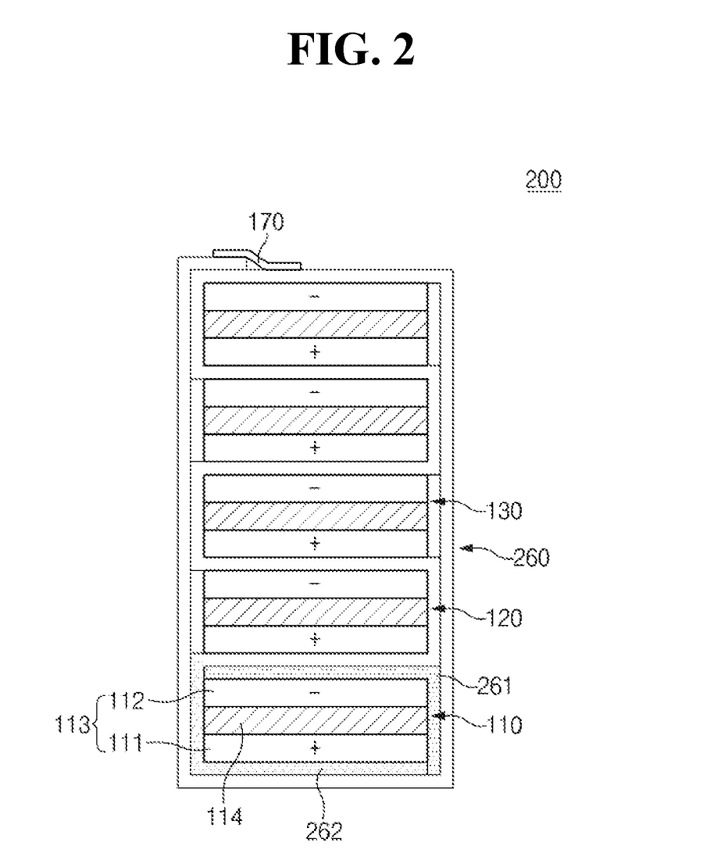
FIG. 2 is an exemplary schematic cross-sectional view of another example of the electrode assembly according to an exemplary embodiment of the present disclosure.

FIG. 1 is an exemplary schematic cross-sectional view illustrating an example of an electrode assembly according to an exemplary embodiment of the present disclosure, and FIG. 2 is an exemplary schematic cross-sectional view of another example of the electrode assembly according to an exemplary embodiment of the present disclosure. Referring to FIG. 1, an electrode assembly 100 according to an exemplary embodiment of the present disclosure comprises a plurality of unit cells 110, 120, 130, 140, and 150 and a separation film 160 folded to be disposed between the plurality of unit cells 110, 120, 130, 140, and 150.

Hereinafter, the electrode assembly according to an exemplary embodiment of the present disclosure will be described in more detail with reference to FIGS. 1 and 2. Each of the unit cells 110, 120, 130, 140, and 150 may be a chargeable/dischargeable power generation device and may have a structure in which at least one electrode 113 and at least one separator 114 are assembled and alternately stacked. An electrode 113 may comprise a positive electrode 111 and a negative electrode 112. Additionally, the separator 114 may separate the positive electrode 111 from the negative electrode 112 to electrically insulate the positive electrode 111 and the negative electrode from each other. Thus, one of the plurality of unit cells 110, 120, 130, 140, and 150 may comprise at least one positive electrode 111, at least one negative electrode 112, and at least one separator 114.

The separator 114 may be formed from an insulation material, and also, the positive electrode 111, the separator 114, and the negative electrode 112 may be alternately stacked. In particular, the separator 114 may be, disposed between the positive electrode 111 and the negative electrode 112. Furthermore, the separator 114 may be disposed between the positive electrode 111 and the negative electrode 112 and may be disposed on an exterior surfaces of the positive electrode 111 and the negative electrode 112. For example, the separator 114 may be a polyethylene film, a polypropylene film, or a multi-layered film obtained by combining the films, which has fine porosity, or a polymer film for a polymer electrolyte or a gel-type polymer electrolyte such as polyvinylidene fluoride, polyethylene oxide, polyacrylonitrile, or polyvinylidene fluoride hexafluoropropylene copolymer.

The separation film 160 may be folded to be disposed between the plurality of unit cells 110, 120, 130, 140, and 150. Additionally, the separation film 160 may be folded at least two times to come into contact with and surround the first unit cell 110, which is disposed at the initial position of the separation film 160, of the plurality of unit cells 110, 120, 130, 140, and 150. Thus, the separation film 160 may completely surround the exposed portion of the electrode 113 of the first unit cell 110 to prevent the electrode 113 from being damaged. Additionally, the separation film 160 surrounding the first unit cell 110 may be prevented from being unfolded. The separation film 160 may comprise a first folding part 161 folded once to surround the first unit cell 110 and a second folding part 162 folded to additionally surround the first unit cell 110.

For example, the first folding part 161 may be provided to surround a first (e.g., one) surface and a first (e.g., one) side surface of the first unit cell 110, and the second folding part 162 may be provided to surround a second (e.g., the other) surface and a second (e.g., the other) side surface of the second unit cell 120. For example, the first folding part 161 may be provided to surround a top surface and a left surface (e.g., a first surface) of the first unit cell 110, which are illustrated in FIG. 1, and the second folding part 162 may be provided to surround a lower surface and a right surface (e.g., a second surface) of the first unit cell 110.

Furthermore, an exterior surface of the first folding part 161 in a folding direction may be coated with an adhesion layer 161a to adhere to a portion of the separation film 160, which faces the exterior surface of the first folding part 161 when the first folding part 161 is folded. Accordingly, the separation film 160 surrounding the first unit cell 110 may be more effectively prevented from being unfolded. Additionally, the first folding part 161 and the second folding part 162 may be provided to surround an outer circumference of the first unit cell 110. For example, although the first and second folding parts 161 and 162 are shown in the separated shape in FIG. 1, the first and second folding parts 161 and 162 may be portions of the long separation film 160 connected in one body.

Referring to FIG. 1, the electrode assembly 100 according to an exemplary embodiment of the present disclosure may further comprise a fixing tape 170 for preventing the folding of the separation film 160 from being unfolded. For example, the fixing tape 170 may be attached from an end of the folded separation film 160 to a portion of the separation film which is adjacent to the end.

In particular, referring to FIG. 1, the separation film may be provided to surround the plurality of unit cells 110, 120, 130, 140, and 150 in the same direction. In other words, the plurality of unit cells 110, 120, 130, 140, and 150 may be successively provided on a first side surface of the separation film 160 and successively folded in one direction. The separation film 160 may surround the plurality of unit cells 110, 120, 130, 140, and 150, and the folded direction of the plurality of unit cells 110, 120, 130, 140, and 150 may be a clockwise direction or a counterclockwise direction.

Additionally, referring to FIG. 2, the separation film 260 may be provided to successively alternately surround the plurality of unit cells 110, 120, 130, 140, and 150 in different directions. In other words, the separation film 160 may be provided to successively alternately surround the plurality of unit cells 110, 120, 130, 140, and 150 in the clockwise direction and the counterclockwise direction. For example, the separation film 260 may surround the first unit cell 110 arranged at a first position in the counterclockwise direction, surround the second unit cell 120 arranged at a second position in the clockwise direction, surround the third unit cell 130 arranged at a third position again in the counterclockwise direction so that the separation film 260 successively surrounds the plurality of unit cells 110, 120, 130, 140, and 150. For example, the portion of the separation film 260 which comprises the first folding part 261 and the second folding part 262 may surround the first unit cell 110. Additionally, the separation film 260 surrounds the circumference of the plurality of unit cells 110, 120, 130, 140, and 150 to form the electrode assembly 200.

Figure 3:
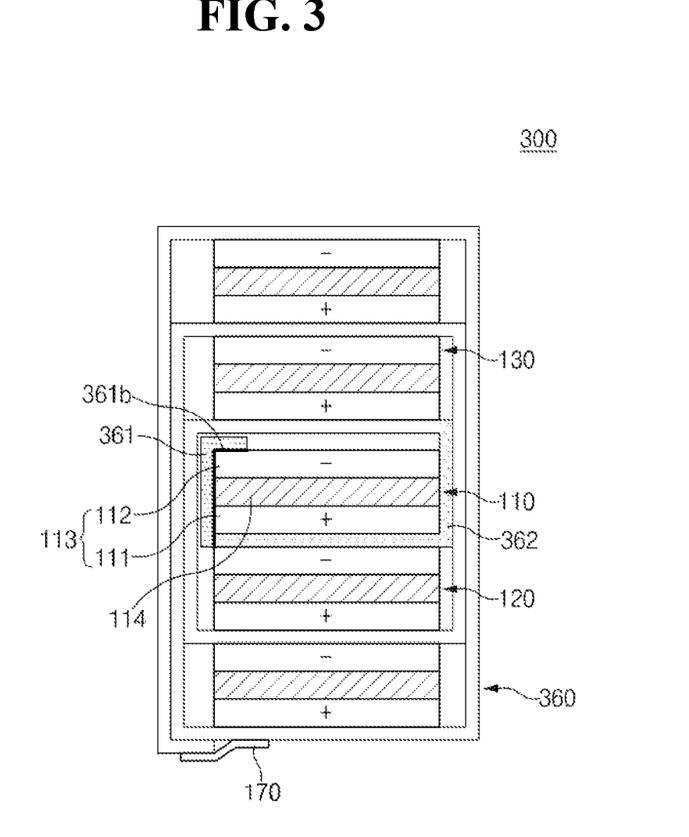
FIG. 3 is an exemplary schematic cross-sectional view of an electrode assembly according to another exemplary embodiment of the present disclosure.
Figure 4A:
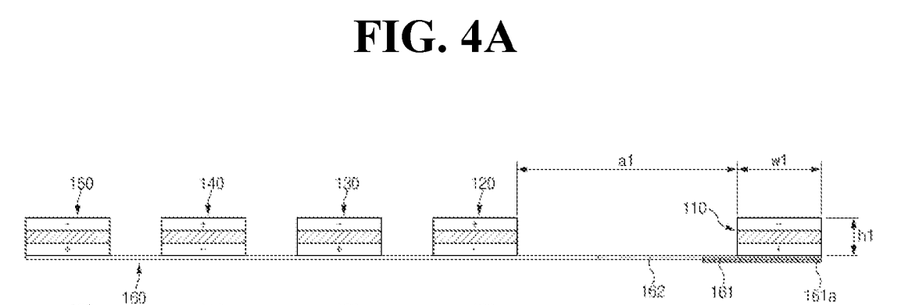
FIG. 4A to 4D are exemplary schematic cross-sectional view illustrating a method for manufacturing an electrode assembly according to further another exemplary embodiment of the present disclosure.
Figure 4B:
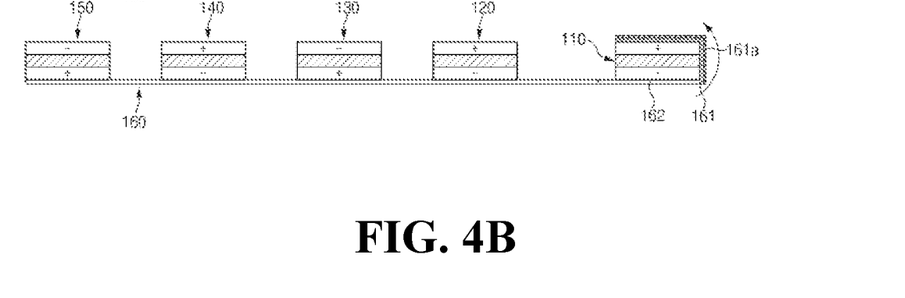
Figure 4C:
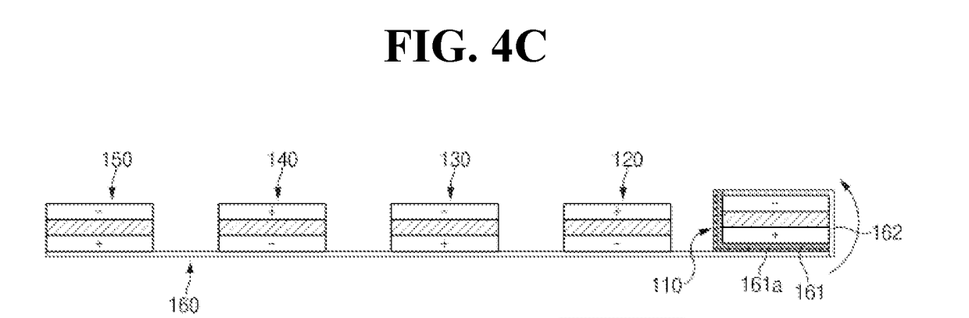
Figure 4D:
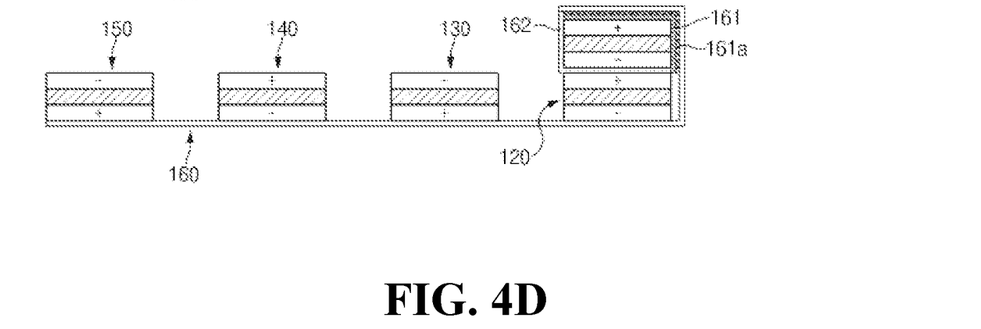

FIG. 3 is an exemplary schematic cross-sectional view of an electrode assembly according to another exemplary embodiment of the present disclosure. Referring to FIG. 3, an electrode assembly 200 according to another exemplary embodiment of the present disclosure may comprise a plurality of unit cells 110, 120, 130, 140, and 150 and a separation film 360 folded to be disposed between the plurality of unit cells 110, 120, 130, 140, and 150. The electrode assembly 300 according to another exemplary embodiment of the present disclosure is different from the electrode assembly 100 according to the foregoing embodiment in that a first folding part 361 of the separation film 360 surrounds a first unit cell 110.

Accordingly, in this exemplary embodiment, descriptions duplicated with those according to the foregoing embodiment will be briefly described and a difference will be described. The separation film 360 of the electrode assembly 300 according to another exemplary embodiment comprises a first folding part 361 surrounding a portion of the first unit cell 110, which is disposed at an initial position of the separation film 360 of the plurality of unit cells 110, 120, 130, 140, and 150 and a second folding part 362.

For example, the first folding part 361 may be provided to surround an end of a first surface (e.g., one) surface (e.g., or a portion of a top surface) and a first (e.g., one) side surface of the first unit cell 110. In other words, the first folding part 361 may be provided to surround an end of the top surface and a left surface (e.g., a first surface) of the first unit cell 110 in FIG. 3. Additionally, an adhesive may be applied to an interior surface of the first folding part 361 in a folding direction to form an adhesion layer 361b. Thus, the first folding part 361 may adhere to the first unit cell 110 through the adhesion layer 361b. Thus, the first folding part 361 may be prevented from being unfolded in the first unit cell 110, and the separation film 360 surrounding the electrode assembly 300 may be prevented from being unfolded. The second folding part 362 may be provided to surround the second (e.g., other) surface and the second (e.g., other) side surface of the second unit cell 120. In other words, the second folding part 362 may be provided to surround a bottom surface and a right surface (e.g., a second surface) of the first unit cell 110 in FIG. 3.

FIG. 4A to 4D are exemplary schematic cross-sectional view of a method for manufacturing an electrode assembly according to an exemplary embodiment of the present disclosure. Referring to FIG. 4A to 4D, a method for manufacturing an electrode assembly according to an exemplary embodiment of the present disclosure may comprise a preparation process of preparing a plurality of unit cells 110, 120, 130, 140, and 150 and a separation film 160 and a seating process of seating the plurality of unit cells 110, 120, 130, 140, and 150 on the separation film 160, and a folding process.

Hereinafter, the method for manufacturing the electrode assembly according to an exemplary embodiment of the present disclosure will be described in more detail. In more detail, referring to FIG. 4A to 4D, in the preparation process, at least one positive electrode 111, at least one negative electrode 112, the plurality of unit cells 110, 120, 130, 140, and 150, each of which comprises at least one separator 114, and the separation film 160 may be prepared. In particular, the separator 114 may be formed from of an insulation material, and the positive electrode 111, the separator 114, and the negative electrode 112 may be alternately stacked.

In the seating process, the plurality of unit cells 110, 120, 130, 140, and 150 may be successively seated on the separation film 160 in one direction. Additionally, in the seating process, the plurality of unit cells 110, 120, 130, 140, and 150 may be successively arranged on the separation film 160. For example, when a distance between the first unit cell 110 and the second unit cell 120 adjacent to the first unit cell 110 of the plurality of unit cells 110, 120, 130, 140, and 150 is defined as a1, a width of the first unit cell 110 may be defined as w1, and a height of the first unit cell 110 may be defined as h1, the unit cells 110, 120, 130, 140, and 150 may be arranged to satisfy a following equation: $2*w1+4*h1<a1$.

Furthermore, in the folding process, the first unit cell 110 may be configured to rotate at an angle of about 360 degree or greater so that the separation film 160 surround a circumference of the first unit cell 110. In the folding process, the separation film 160 on which the plurality of unit cells 110, 120, 130, 140, and 150 are seated may be successively folded to disposed the separation film 160 between the plurality of unit cells 110, 120, 130, 140, and 150. Additionally, in the folding process, the separation film 160 may be folded at least two times to come into contact with and surround the first unit cell 110, which is disposed at an initial portion of the separation film 160, of the plurality of unit cells 110, 120, 130, 140, and 150. For example, the separation film 160 may comprise a first folding part 161 folded once to surround the first unit cell 110 and a second folding part 162 additionally folded one more time to surround the first unit cell 110.

Additionally, the folding process may comprise a first folding process of folding an end of the first separation film 160 in a direction of the first unit cell 110 to allow the first folding part 161 of the separation film 160 to surround a first (e.g., one) surface and a first (e.g., one) side surface of the first unit cell 110 and a second folding process of rotating the first unit cell 110 at an angle of about 180 degrees to allow the second folding part 162 of the separation film 160 to additionally surround a circumference of the first unit cell 110. For example, in the first folding process, the first folding part 161 and the first unit cell 110 may be configured to rotate and be folded together. The first folding part 161 may be folded to surround the first unit cell 110.

The folding process may comprise an adhesion layer applying process of applying an adhesion layer 161a to an exterior surface with respect to the folding direction of the first folding part 161 and an adhesion process of adhering a portion of the separation film 160, which faces the first folding part 161, to the adhesion layer 161a, when folded. Thus, the first folding part 161 surrounding the first unit cell 110 may be effectively prevented from being unfolded.

Referring to FIGS. 1 and 4A to 4D, in the method for manufacturing the electrode assembly according to an exemplary embodiment, when the separation film 160 and the plurality of unit cells 110, 120, 130, 140, and 150 are folded, the first unit cell 110 is disposed at the initial position of the separation film 160 may be folded two times to allow the separation film 160 to surround an exterior circumference of the first unit cell 110, prevent the separation film 160 surrounding the first unit cell 110, which is disposed at the initial position of the separation film 160, from being frequently unfolded, and prevent an electrode 113 of the first unit cell 110 from being exposed. Additionally, the electrode assembly 100 and the secondary battery in which the electrode assembly 100 is mounted may be improved in stability through the strongly folded and coupled structure.

FIG. 5A to 5D are exemplary schematic cross-sectional view of a method for manufacturing an electrode assembly according to an exemplary embodiment of the present disclosure. Referring to FIG. 5A to 5D, a method for manufacturing an electrode assembly according to an exemplary embodiment of the present disclosure may comprise a preparation process of preparing a plurality of unit cells 110, 120, 130, 140, and 150 and a separation film 160, a seating process, and a folding process.

The method for manufacturing the electrode assembly according to an exemplary embodiment of the present disclosure is different from the method for manufacturing the electrode assembly according to another exemplary embodiment of the present disclosure in that a first folding part of the separation film 160 surrounds a first unit cell 110 before the first unit cell 110 rotates. Thus, in this embodiment, descriptions duplicated with those according to further exemplary embodiment will be briefly described, and a difference will be described.

Referring to FIGS. 1 and 5A to 5D, in the seating process, the plurality of unit cells 110, 120, 130, 140, and 150 are seated on a first (e.g., one) surface of the separation film 160. For example, the separation film 160 may comprise a first folding part 161 folded once to surround the first unit cell 110 and a second folding part 162 additionally folded one more time to surround the first unit cell 110. When the first unit cell 110 is seated on the separation film 160, the first unit cell 110 may be seated to be spaced a predetermined distance from an end of the separation film 160 so that the first folding part 161 of the separation film 160 is disposed between the first unit cell 110, which is disposed at an initial position of the separation film 160, and the end of the separation film 160.

Figure 5A:
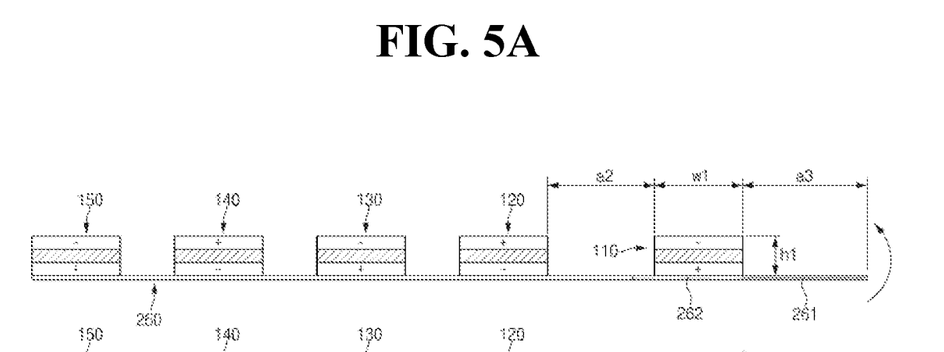
FIG. 5A to 5D are exemplary schematic cross-sectional view illustrating a method for manufacturing an electrode assembly according to another exemplary embodiment of the present disclosure.
Figure 5B:
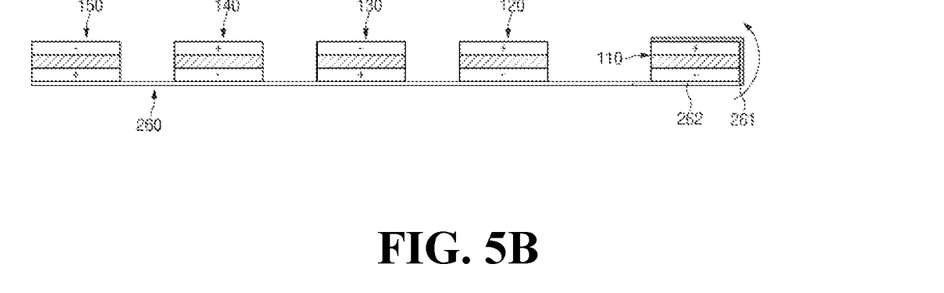
Figure 5C:
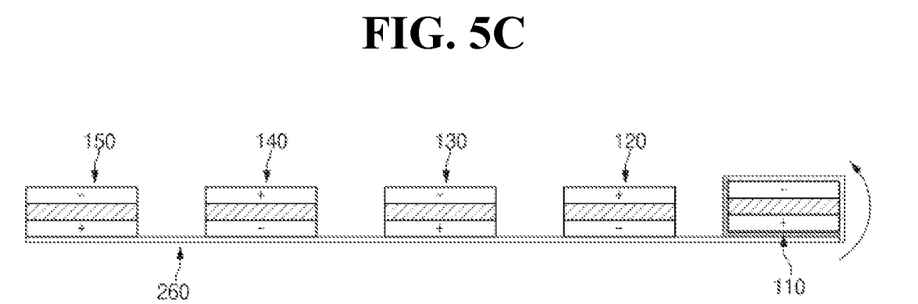
Figure 5D:
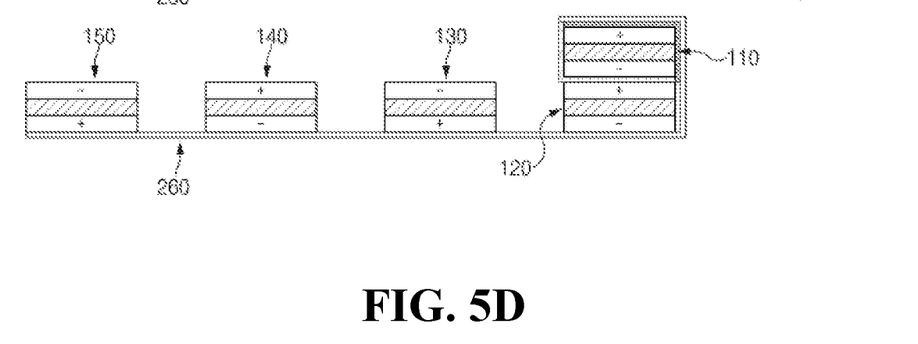
Figure 6A:
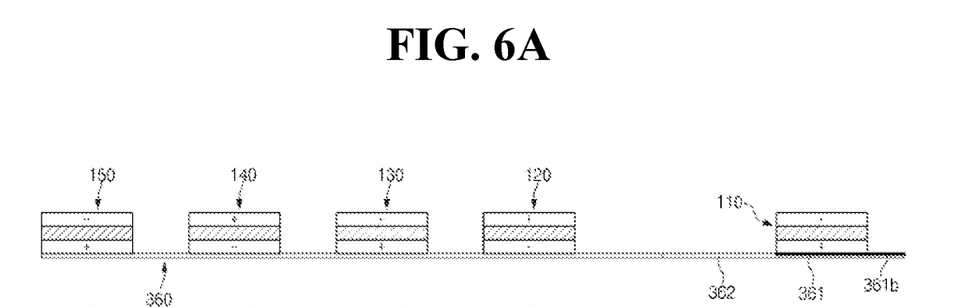
FIG. 6A to 6D are exemplary schematic cross-sectional view illustrating a method for manufacturing an electrode assembly according to another exemplary embodiment of the present disclosure.
Figure 6B:
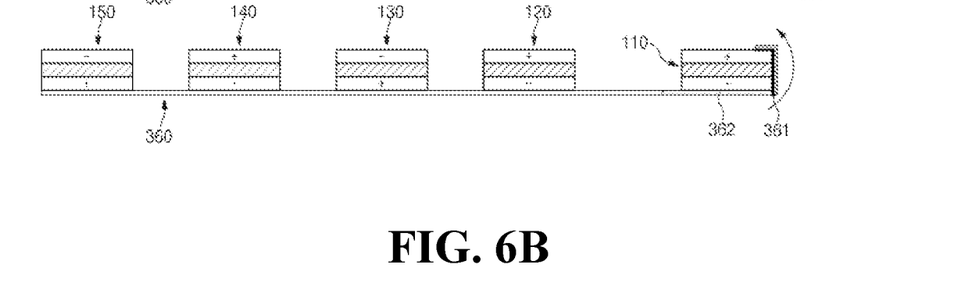
Figures 6C, 6D:
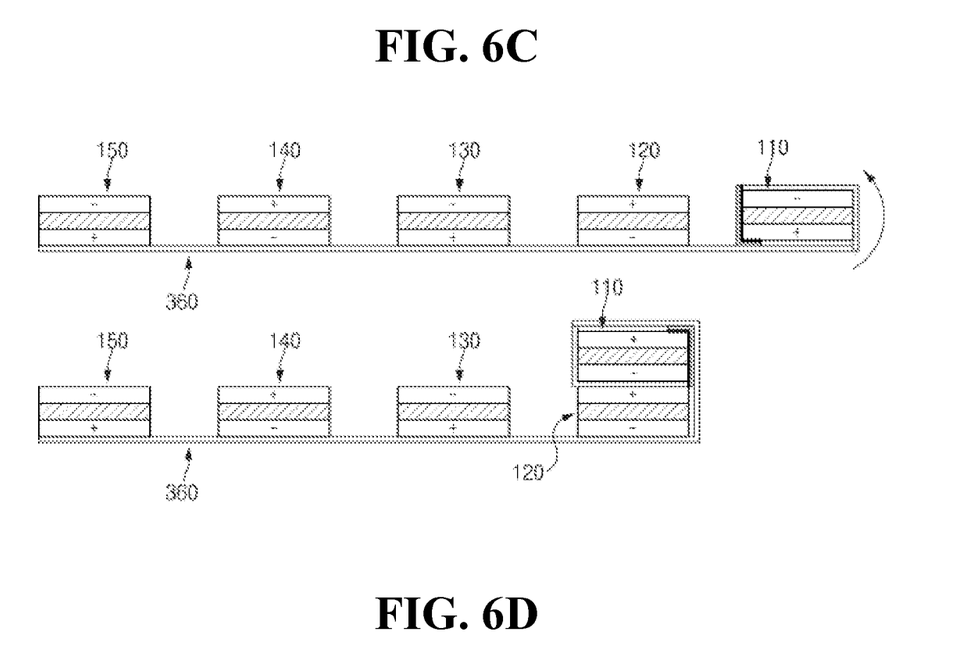

Additionally, referring to FIG. 5A, in the seating process, the plurality of unit cells 110, 120, 130, 140, and 150 may be successively arranged on the separation film 160. For example, when a distance between the first unit cell 110 and the second unit cell 120 adjacent to the first unit cell 110 of the plurality of unit cells 110, 120, 130, 140, and 150 is defined as a1, a distance between the end of the separation film 160 and the first unit cell 110 is defined as a3, a width of the first unit cell 110 is defined as w1, and a height of the first unit cell 110 is defined as h1, the unit cells 110, 120, 130, 140, and 150 may be arranged to satisfy a following equation: $1*w1+3*h1<a2$ and $1*w1+1*h1<a3$.

The folding process may comprise a first folding process of folding first folding part 160 to the first unit cell 110 and a second folding process of rotating the first unit cell 110 at an angle of about 180 degrees to allow the second folding part to surround a circumference of the first unit cell 110. In particular, in the first folding process, the first folding part 161 of the separation film 160 may be folded to surround the first unit cell 110. For example, the first folding part 161 may be folded to surround a side surface and a first (e.g., one) surface of the first unit cell 110. In other words, the first folding part 161 may be folded to surround a right surface and a top surface of the first unit cell 110 in FIG. 5A to 5D.

FIG. 6A to 6D are a schematic cross-sectional view illustrating a method for manufacturing an electrode assembly according to another exemplary embodiment of the present disclosure. Referring to FIG. 6A to 6D, a method for manufacturing an electrode assembly according to another exemplary embodiment of the present disclosure may comprise a preparation process of preparing a plurality of unit cells 110, 120, 130, 140, and 150 and a separation film 360, a seating process, and a folding process. For example, the folding process may comprise a first folding process of performing folding once and a second folding process of performing folding two times.

The method for manufacturing the electrode assembly according to another exemplary embodiment of the present disclosure is different from the methods for manufacturing the electrode assembly according to other exemplary embodiments of the present disclosure in that a first folding part 361 of the separation film 360 may be folded to an end of one surface and a side surface of the first unit cell 110. Thus, in this exemplary embodiment, descriptions duplicated with those according to the other exemplary embodiments will be briefly described, and a difference will be mainly described.

Referring to FIGS. 3 and 6A to 6D, in the method for manufacturing the electrode assembly according to even another embodiment of the present disclosure, in the first folding process, the first folding part 361 may be folded to surround an end of a first surface (e.g., one) surface (or a portion of a top surface) and a first (e.g., one) side surface of the first unit cell 110. Thus, exposure of an electrode 113 of the first unit cell 110, may be prevented, and the separation film 360 may be prevented from being unfolded after the folding.

Additionally, the first folding process may further comprise an adhesive applying process of applying an adhesive to an interior surface in the folding direction of the first folding part 361 to form an adhesion layer 361b and an adhesion process of adhering the first folding part 361 to the first unit cell 110 through the adhesion layer 361b. Thus, the first folding part 361 may be prevented from being unfolded from the first unit cell 110, and the separation film 360 surrounding the electrode assembly 300 may be prevented from being unfolded. In the first folding process, air may be injected to the first folding part 361 of the separation film 360 to fold the first folding part 361 to the first unit cell 110. For example, the air may be injected through an air compressor. Additionally, in the first folding process, the first folding part 361 may be folded to the first unit cell 110 through a sharp change of direction (e.g., zig).

Furthermore, in the first folding process, the first folding part 361 may be folded to the first unit cell 110 through an insertion mechanism. Additionally, in the first folding process, the first folding part 361 may be folded with force of gravity. For example, when the first folding part 361 is horizontally disposed, and a portion expect for the first folding part is fixed, the first folding part 361 may be folded with the force of gravity. In other words, the portion except for the folding portion may be fixed, and the folding portion may be horizontally disposed to fold the first folding part 361 by using the force of gravity.

According to the present disclosure, in the electrode assembly in which the plurality of unit cells together with the separation film are folded, the separation film surrounding the unit cell that is disposed at the initial position of the separation film may be prevented from being unfolded, and the electrode may not be exposed to provide a more stable electrode assembly.

While the present disclosure has been particularly shown and described with reference to exemplary embodiments thereof, it is to be understood that the same is by way of illustration and example only and is not to be construed as limiting the disclosure. It will be understood by those skilled in the art that various changes in form and details may be made therein without departing from the spirit and scope of the disclosure.

What is claimed is:

1. A method for manufacturing an electrode assembly comprising:
    preparing a plurality of unit cells, each of which comprises a positive electrode, a negative electrode, and a separator, and a separation film;
    seating the plurality of unit cells successively arranged on a first surface of the separation film; and
    folding the separation film on which the unit cells are seated to dispose the separation film between the plurality of unit cells,
    wherein, in the folding, the separation film is folded at least two times to come into contact with and surround a first unit cell, which is disposed at an initial position of the separation film, of the plurality of unit cells, and
    wherein a distance between the first unit cell and a second unit cell adjacent to the first unit cell of the plurality of unit cells is defined as a1, a width of the first unit cell is defined as w1, and a height of the first unit cell is defined as h1, the unit cells are arranged to satisfy a following equation: $2*w1+4*h1<a1$.

2. The method of claim 1, wherein, folding includes, the first unit cell rotated at an angle of about 360 degrees or greater to allow the separation film to surround a circumference of the first unit cell.

3. The method of claim 1, wherein the folding comprises:
    folding an end of the first separation film toward the first unit cell in a first folding process to allow a first folding part of the separation film to surround the first surface and a first side surface of the first unit cell; and
    rotating the first unit cell in a second folding process at an angle of about 180 degrees to allow a second folding part of the separation film to additionally surround a circumference of the first unit cell.

4. The method of claim 3, wherein the first folding process includes the first folding part that surrounds an end of the first surface and the first side surface of the first unit cell.

5. The method of claim 4, wherein the first folding process includes air injected to the first folding part of the separation film to fold the first folding part to the first unit cell.

6. The method of claim 4, wherein the first folding process includes the first folding part folded to the first unit cell through a sharp change of direction.

7. The method of claim 1, wherein the separation film comprises a first folding part folded to surround the first unit cell and a second folding part additionally folded one more time to surround the first unit cell; and
    wherein the folding further comprises: applying an adhesion layer to an exterior surface in a folding direction of the first folding part; and adhering a portion of the separation film, which faces the first folding part, to the adhesion layer when folded.

8. The method of claims 3, wherein the first folding process further comprises:
   applying the adhesion layer to an interior surface in the folding direction of the first folding part to form an adhesion layer; and
   adhering the first folding part to the first unit cell through the adhesion layer.

9. An electrode assembly comprising:
   a plurality of unit cells comprising a positive electrode, a negative electrode, and a separator, respectively; and
   a separation film folded to be disposed between the plurality of unit cells,
   wherein the separation film is folded at least two times to come into contact with and surround a first unit cell, which is disposed at an initial position of the separation film of the plurality of unit cells,
   wherein a distance between the first unit cell and a second unit cell adjacent to the first unit cell of the plurality of unit cells is defined as a1, a width of the first unit cell is defined as w1, and a height of the first unit cell is defined as h1, the unit cells are successively arranged on a first surface of the separation film to satisfy a following equation: $2*w1+4*h1<a1$.

10. The electrode assembly of claim 9, wherein the separation film comprises a first folding part folded to surround the first unit cell and a second folding part additionally folded one more time to surround the first unit cell.

11. The electrode assembly of claim 10, wherein the first folding part adheres to a portion of the separation film, which faces the first folding part when folded, by applying an adhesion layer to an exterior surface thereof in a folding direction.

12. The electrode assembly of claim 10, wherein the first folding part and the second folding part surround an entire exterior circumference of the first unit cell.

13. The electrode assembly of claim 10, wherein the first folding part surrounds an end of a first surface and a first side surface of the first unit cell, and
   the second folding part surrounds a second surface and a second side surface of the first unit cell.

14. The electrode assembly of claim 10, wherein an adhesion layer is disposed on an interior surface of the first folding part in a folding direction so that the first folding part adheres to the first unit cell through an adhesion layer.

* * * * *